US012439208B2

(12) United States Patent
Jin et al.

(10) Patent No.: US 12,439,208 B2
(45) Date of Patent: Oct. 7, 2025

(54) FULL-FREQUENCY BAND HIGH QUALITY PLANAR RESONANCE SPEAKER WITH A BAR AND SOUND TUNNELS

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 354 days.

(21) Appl. No.: 18/026,278

(22) PCT Filed: Dec. 15, 2020

(86) PCT No.: PCT/CN2020/136577
§ 371 (c)(1),
(2) Date: Mar. 14, 2023

(87) PCT Pub. No.: WO2022/036955
PCT Pub. Date: Feb. 24, 2022

(65) Prior Publication Data

US 2023/0370779 A1 Nov. 16, 2023

(30) Foreign Application Priority Data

Aug. 19, 2020 (CN) ......................... 202010838328.6

(51) Int. Cl.
*H04R 7/06* (2006.01)
*H04R 1/24* (2006.01)
(Continued)

(52) U.S. Cl.
CPC ................. *H04R 7/06* (2013.01); *H04R 1/24* (2013.01); *H04R 7/20* (2013.01)

(58) Field of Classification Search
CPC ... H04R 7/04; H04R 7/06; H04R 1/24; H04R 7/20
See application file for complete search history.

(56) References Cited

U.S. PATENT DOCUMENTS

2004/0022409 A1* 2/2004 Hutt .................... B60R 11/0223 381/423
2010/0290648 A1 11/2010 Zhang
2020/0275210 A1* 8/2020 Huang ................. H04R 1/2834

FOREIGN PATENT DOCUMENTS

CN 103347233 A 10/2013
CN 209693035 U 11/2019
CN 111954124 A 11/2020

OTHER PUBLICATIONS

May 19, 2021 International Search Report issued in International Patent Application No. PCT/CN2020/136577.

* cited by examiner

*Primary Examiner* — Suhan Ni
(74) *Attorney, Agent, or Firm* — Oliff PLC

(57) ABSTRACT

A full-frequency band high quality planar resonance speaker with a bar and sound tunnels includes a planar diaphragm, whose outer edge is connected to the outer frame of the speaker through an elastic connector; a sound source is arranged in the middle; first and second grooves are arranged on the surface of the diaphragm and are crossed and connected with each other, the surface of the diaphragm is divided into four resonance regions; the diaphragm includes a bar assembly at the center of the surface with the grooves, which includes a plurality of strip-shaped bar members arranged on both sides of the grooves in pairs; the
(Continued)

grooves form a sound tunnel on the surface of the diaphragm. The speaker solves the problem that the timbre of treble register is not bright and the timbre of bass register is not sonorous and mellow from the perspective of vibration, resonance and phonation.

6 Claims, 5 Drawing Sheets

(51) Int. Cl.
*H04R 7/04* (2006.01)
*H04R 7/20* (2006.01)

FULL-FREQUENCY BAND HIGH QUALITY PLANAR RESONANCE SPEAKER WITH A BAR AND SOUND TUNNELS

TECHNICAL FIELD

The invention relates to a planar resonance speaker, in particular to a full-frequency band high quality planar resonance speaker with a bar and sound tunnels.

BACKGROUND TECHNOLOGY

Resonance speaker is a kind of special speaker used in electronic products (such as smart speakers). It is usually used in conjunction with other speakers in the audio system. It can be installed on the peripheral part of the main speaker to play an auxiliary role. It is used to strengthen and improve the sound quality, help restore the original sound and improve the sound fidelity. As shown in FIGS. 1 and 2, the diaphragm 1 of the traditional planar resonance speaker is connected to the outer frame 3 of the speaker through the elastic connector 2 (rubber band can be selected) around the diaphragm 1. When the speaker is working, the vibration of diaphragm 1 pushes the air to produce sound.

The common problem of the traditional planar resonance speaker is that the speaker has an inherent resonance frequency when it sounds. Beyond a certain range of the resonance frequency, the timbre of treble register is not bright enough, and the timbre of bass register is not mellow enough, unable to achieve high-quality sound in full frequency band. The main reason is that the current speaker diaphragm can't complete a good broadband vibration between treble and bass register. That is to say, it can't simultaneously adapt to the resonance and vibration with wide-frequency changes of the treble, alto and bass register. The traditional planar resonance speaker with unreasonable structure design is not conducive to the sound wave vibration of the diaphragm from treble register to bass register.

Therefore, how to solve the shortcomings of the above existing technologies has become the subject to be studied and solved by the invention.

SUMMARY OF THE INVENTION

The purpose of the invention is to provide a full-frequency band high quality planar resonance speaker with a bar and sound tunnels.

To achieve the above purpose, the technical scheme adopted by the invention is:

A full-frequency band high quality planar resonance speaker with a bar and sound tunnels comprises a diaphragm; the diaphragm is planar, of which the outer edge is connected to the outer frame of the speaker through an elastic connector; a sound source is arranged in the middle of the diaphragm;

the first groove and the second groove are arranged on the surface of at least one side of the diaphragm; the first groove and the second groove are crossed and connected with each other on the surface of the diaphragm and the intersection point is located at the center of the diaphragm; then the surface of the diaphragm is equally divided into four resonance regions;

The diaphragm is also provided with a bar assembly at the center of the same side surface with the first groove and the second groove; the bar assembly comprises a plurality of strip-shaped bar members, which are arranged on both sides of the first groove and the second groove in pairs; the first groove and the second groove respectively form a sound tunnel on the surface of the diaphragm.

Relevant contents of the above technical scheme are explained as follows:

1. In the above scheme, "the first groove and the second groove are crossed and connected with each other on the surface of the diaphragm" is helpful to rapidly transmit the vibration of the sound source to the surrounding of the diaphragm through the cross-shaped sound tunnel (i.e. the tunnel of sound) formed by two grooves.
2. In the above scheme, the intersection of the first groove and the second groove is located at the center of the diaphragm, which improves the sound quality and timbre of the diaphragm.
3. In the above scheme, a connecting bar is arranged between the two adjacent strip-shaped bar members, and the connecting bar spans the upper part of the first groove and the second groove, forming the bar assembly in a well shape; and each connecting bar is located in the central area of the surface of the diaphragm. With this design, the central area of the diaphragm will be strengthened.
4. In the above scheme, the diaphragm is divided into a treble region on the periphery, an alto region in the middle and a bass region in the center according to sound frequency band; the wall thickness of the diaphragm is gradually increased from the periphery to the center, so that the wall thickness of the bass area is greater than the wall thickness of the alto region, and the wall thickness of the alto region is greater than the wall thickness of the treble region; the bar assembly is located in the bass region.

Through this design, the thicker bass region is set close to the center, which can make the low frequency vibration with lower frequency and larger amplitude send out more sonorous and mellow bass in the bass region of the diaphragm; By setting the thin treble region far away from the center, the high frequency vibration with higher frequency and smaller amplitude will emit a more transparent and bright treble in the treble region of the diaphragm, so that the timbre and sound quality of the speaker in the full frequency band are effectively improved.

5. In the above scheme, the thickness of the inner end of the strip-shaped bar member is greater than the thickness of its outer end. With this design, the central area of the diaphragm will be strengthened.
6. In the above scheme, the first groove and the second groove are arc grooves, which reduce the sudden change of thickness of the diaphragm as far as possible and avoid affecting the resonance and vibration of the diaphragm.
7. In the above scheme, the length of the first groove and the second groove are both less than the horizontal width of the diaphragm; a smooth transition surface is arranged between the outer end of the first groove and the second groove and the surface of the diaphragm.

The working principle and advantages of the invention are as follows: The invention discloses a full-frequency band high quality planar resonance speaker with a bar and sound tunnels, including a diaphragm, which is planar, its outer edge is connected to the outer frame of the speaker through an elastic connector, and its middle part is set corresponding to the sound source; At least one surface of the diaphragm is provided with a first and a second groove. The two grooves are crossed and connected with each other, and the diaphragm surface is equally divided into four resonance areas; In the center of the same side surface with two grooves, the diaphragm is also provided with a bar assembly, including a plurality of strip-shaped bar members; the strip-shaped bar members are arranged on both sides of the first groove and the second groove in pairs; The two grooves form sound tunnels on the surface of the diaphragm respectively.

Compared with the prior art, the present invention improves the previous planar resonance speaker, especially the diaphragm design in the speaker, in order to solve the problem that the previous speaker is unable to take into account the treble, alto and bass registers and have good resonance timbre at the same time. It is embodied in the following aspects: first, a bar assembly is set up on the surface of the diaphragm; Second, the surface of the diaphragm is provided with a cross-shape groove, the cross-shape groove on the surface of the diaphragm to form a cross-shape sound tunnel.

Aiming at the problem that the timbre of treble register of the previous planar resonance speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous planar resonance speaker composition design, and boldly proposes an improved scheme of the invention. This improved scheme changes the diaphragm from the previous free vibration mode to the current standard vibration mode, and solves the problem that the timbre of treble register of the previous planar resonance speaker is not bright and the timbre of bass register is not sonorous and mellow enough from the perspective of vibration, resonance and phonation. The practice proves that the improved scheme has outstanding substantive characteristics and remarkable technical progress, and has obtained obvious technical results.

Due to the application of the above technical scheme, the invention has the following advantages and effects compared with the previous diaphragm of planar resonance speaker:

1. The invention sets a bar assembly on the surface of the diaphragm. Because of the large amplitude and low frequency of the bass relative to the treble, the bass resonance is concentrated in the central region of the diaphragm, and the treble resonance is concentrated in the surrounding edge region of the diaphragm, which enhances the strength of the central region of the diaphragm, and plays an important role in improving the timbre and sound quality of the bass region. Because the thickness of the diaphragm is gradually changed from thick in the central area to thin in the surrounding area, the strength of the central area of the diaphragm is strengthened, and the thickness difference between the central area of the diaphragm and the surrounding edge area is relatively changed, which can also play a beneficial role in improving the timbre and sound quality of the treble register.
2. The invention sets a cross-shape groove on the surface of the diaphragm. The cross-shape groove actually forms a cross-shape sound tunnel on the surface of the diaphragm. The vibration is collected from the center of the diaphragm and rapidly transmitted to the surrounding edges of the diaphragm through the cross-shape sound tunnel (that is, the tunnel of sound), which plays a key role in improving the timbre and sound quality of the treble register.
3. Through the design of bar assembly and cross-shape grooves, four resonance areas are equally divided on the diaphragm. When the planar resonance speaker works, the vibration of the external sound source is first transmitted to the central region of the diaphragm, and then transmitted to each resonance region through the sound tunnel, and resonance and vibration are generated, so as to amplify the vibration of the external sound source into the resonance sound of the diaphragm. Each resonance region can produce one sound wave, plus one original sound wave, a total of five sound waves. The amount of sound wave is the number of sound waves, which directly affects the timbre, penetration and volume of the diaphragm. Therefore, the design of the invention can significantly improve the timbre of the treble and bass registers and increase the penetration and volume of the treble and bass registers.
4. The bar assembly and grooves of the invention can be arranged on the upper surface of the diaphragm, or on the lower surface of the diaphragm, and can also be respectively arranged on the upper and lower surfaces of the diaphragm at the same time.

In the above figures: 1. diaphragm; 2. elastic connector; 3. outer frame; 4. diaphragm; 5. first groove; 6. second groove; 7. resonance region; 8. bar assembly; **8*a*. strip-shaped bar member; 8*b***. connecting bar.

SPECIFIC IMPLEMENTATION

The invention is further described in combination with the attached figures and embodiments below:

Embodiment: The present invention will be clearly explained by the following schematics and detailed descriptions. Any person skilled in the field, after learning the embodiments of the present invention, may change and modify them by the techniques taught by the present invention, which is not out of the spirit and scope of the present invention.

The terms used herein are only for describing specific embodiments, and are not intended to limit the case. Singular forms such as "one", "this", "the" as used herein, also include plural forms.

The terms "first" and "second" used in this article are not intended to refer specifically to the order, nor to limit the case, but only to distinguish components or operations described in the same technical terms.

As used herein, "connection" or "positioning" can refer to two or more components or devices making physical contact with each other directly or indirectly, and can also refer to two or more components or devices operating or acting with each other.

The terms "comprise", "including", "provided", and etc. used in this article are all open terms, which means including but not limited to.

The terms used in this article, unless otherwise specified, usually have the common meaning of each word used in this field, in the content of this case and in the special content. Some words used to describe the invention will be discussed below or elsewhere in this specification to provide additional guidance for those skilled in the art on the description of the case.

The words "upper" and "lower" used in this article are directional words. In this invention, they are only used to describe the position relationship between the structures, not to define the specific direction of the protection scheme and actual implementation of the invention.

Figure 1:
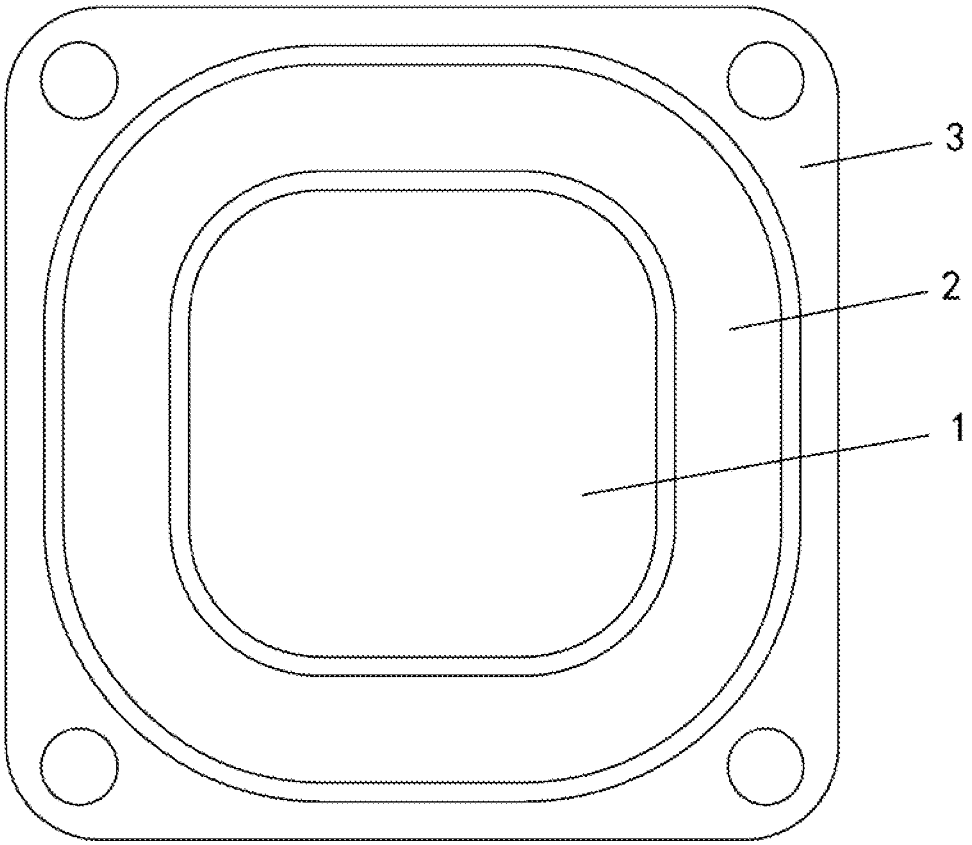
FIG. 1 is a structural schematic diagram of the existing planar resonance speaker.
Figure 2:
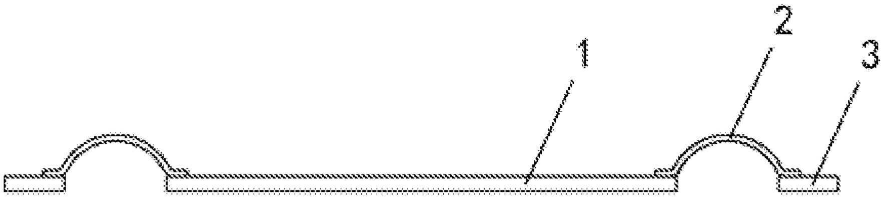
FIG. 2 is a sectional schematic diagram of the existing planar resonance speaker.
Figure 3:
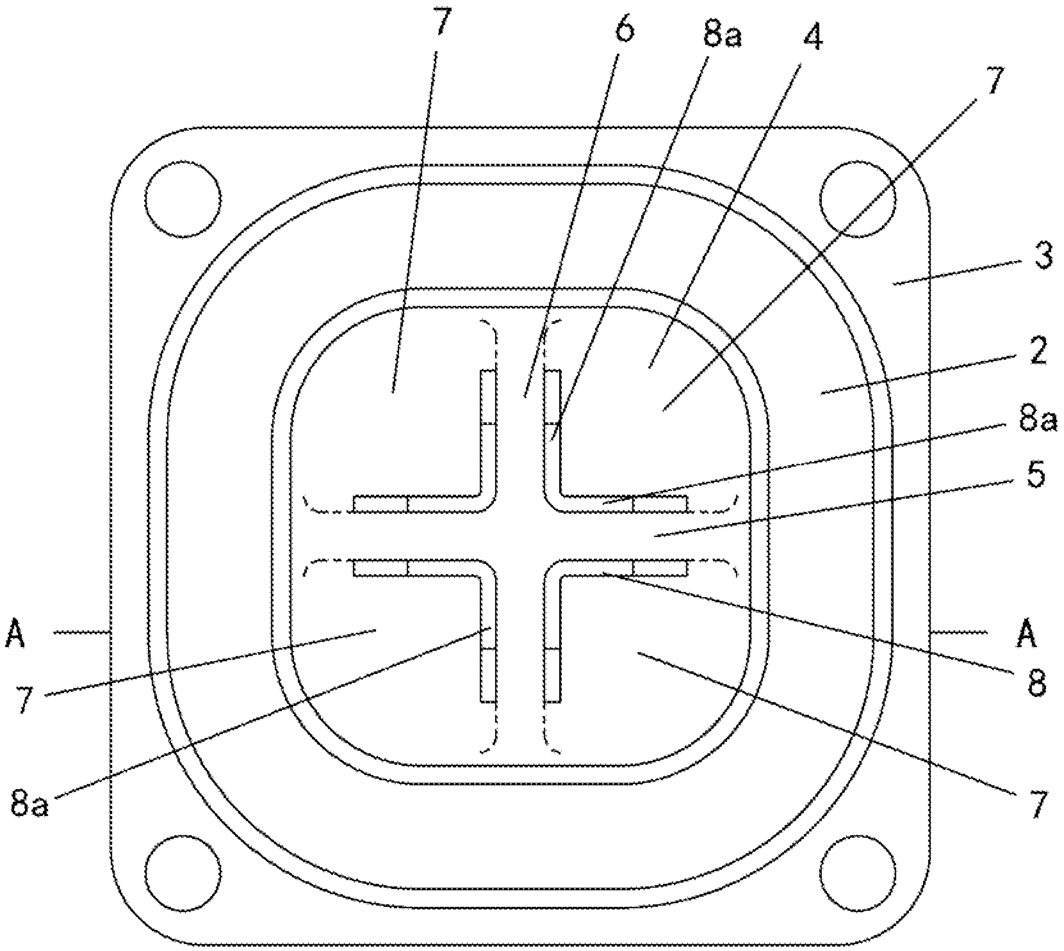
FIG. 3 is a structural schematic diagram of the invention (without connecting bars)
Figure 4:
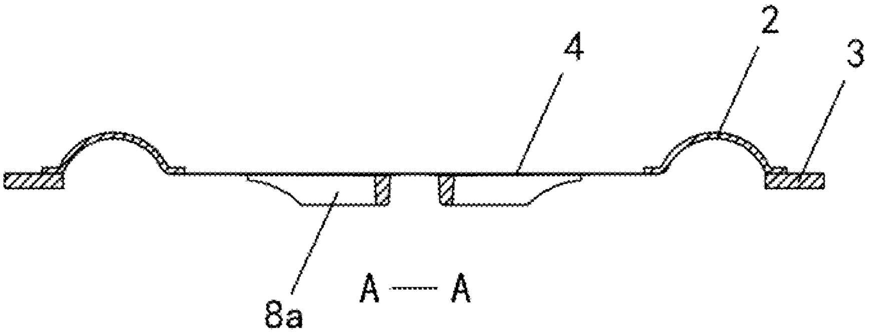
FIG. 4 is a sectional schematic diagram of A-A section in FIG. 3.

As shown in FIGS. 3 and 4, a full-frequency band high quality planar resonance speaker with a bar and sound tunnels includes a diaphragm 4; the diaphragm 4 is planar, its outer edge is connected to the outer frame 3 of the speaker through an elastic connector 2, and the middle of the diaphragm 4 corresponds to a sound source (such as the main speaker).

The lower surface of the diaphragm 4 is provided with a first groove 5 and a second groove 6. The two grooves form a transverse and a longitudinal tunnel on the lower surface of the diaphragm 4 respectively.

Among them, the first groove 5 and the second groove 6 cross and connect with each other on the lower surface of the diaphragm 4, and the intersection point is located in the center of the diaphragm 4, which is helpful to rapidly transmit the vibration of the sound source to the surrounding of the diaphragm 4 through the cross-shaped sound tunnel formed by the two grooves 5 and 6. The intersection point of the first groove 5 and the second groove 6 is located in the center of the diaphragm 4, and the surface of the diaphragm 4 is equally divided into four resonance regions 7.

By setting a cross-shaped groove on the lower surface of diaphragm 4, the cross-shaped groove actually forms a cross-shaped sound tunnel on the lower surface of diaphragm 4, and the area close to the center gathers the vibration of the external sound source, and then rapidly transmits to the periphery of diaphragm 4 through the cross-shaped sound tunnel, which plays a key role in improving the timbre and sound quality of the treble register. At the same time, by dividing four resonance areas 7 on the diaphragm 4, vibration can be transmitted to these four resonance areas 7 through the sound tunnel and generate resonance, which can significantly improve the timbre of the treble and bass register.

The center of the lower surface of the diaphragm 4 is also provided with a bar assembly 8. The bar assembly 8 includes a plurality of strip-shaped bar members 8*a*, which are arranged on both sides of the first groove 5 and the second groove 6 in pairs.

By setting the bar assembly 8 on the lower surface of the diaphragm 4, due to the large amplitude and low frequency of the bass relative to the treble, the bass resonance is concentrated in the central area of the diaphragm 4, and the treble resonance is concentrated in the surrounding edge area of the diaphragm 4, strengthening the strength of the central area of the diaphragm 4, which plays an important role in improving the timbre and sound quality of the bass area. Because the thickness of diaphragm 4 is thick in the central area and thin in the surrounding area, the thickness gradient structure (that is, the design of thin outside and thick inside) strengthens the strength of the central area of diaphragm 4, and relatively changes the thickness difference between the central area and the surrounding edge area of diaphragm 4, which also plays a beneficial role in improving the timbre and sound quality of the treble register.

Figure 7:
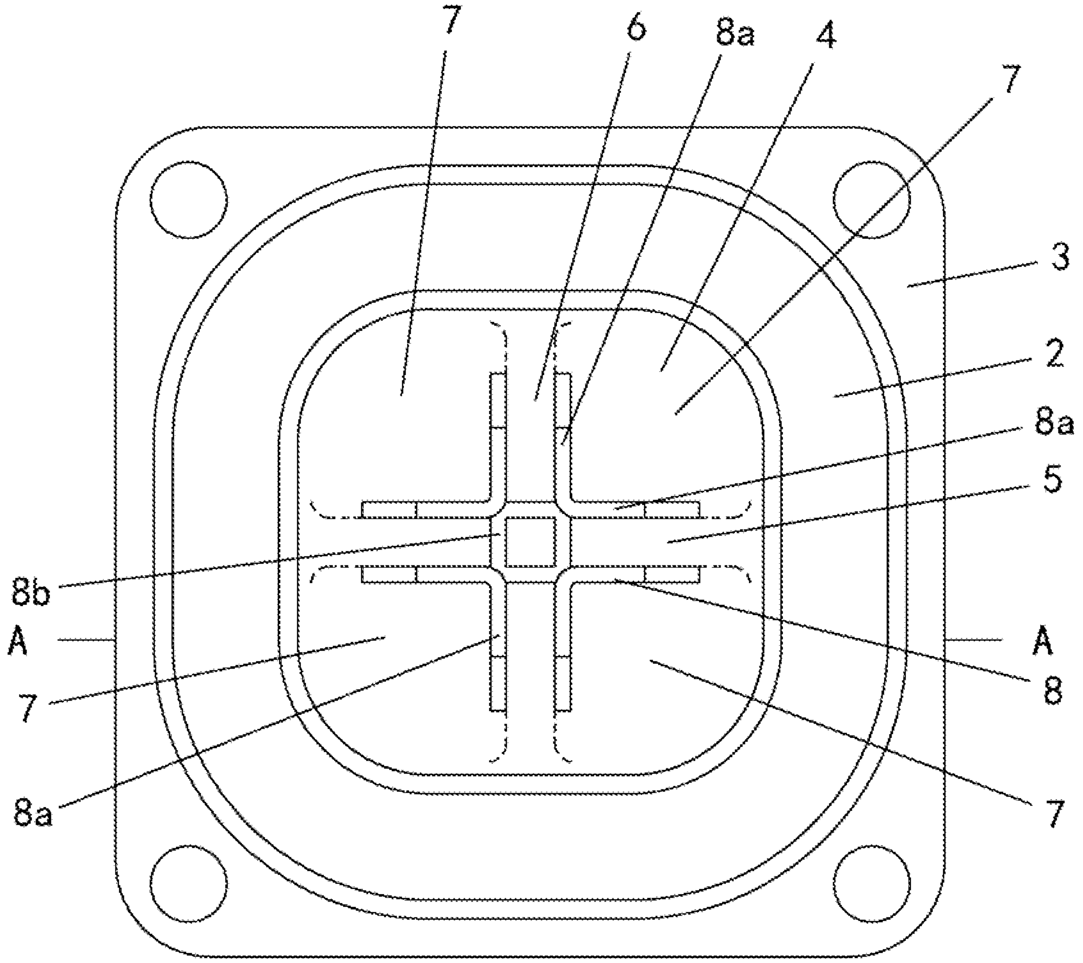
FIG. 7 is a structural schematic diagram of the invention (with connecting bars)
Figure 8:
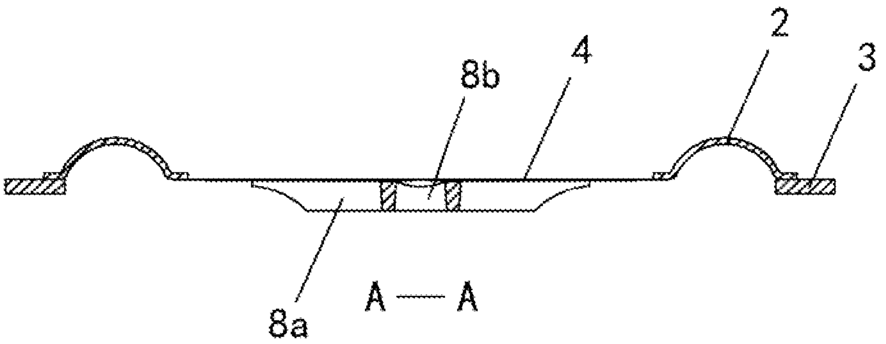
FIG. 8 is a sectional schematic diagram of A-A section in FIG. 7.

Preferred, as shown in FIGS. 7 and 8, a connecting bar 8*b* is arranged between the two adjacent strip-shaped bar members 8*a*, and the connecting bars 8*b* spans above the first groove 2 and the second groove 3, forming the bar assembly 8 in a well shape; And each connecting bar 8*b* is located in the central area of the surface of the diaphragm 4. Four connecting bars 8*b* form a "square" shaped strengthening structure, which further strengthen the bass area in the center of diaphragm 4, so as to further improve the sound quality of the bass area of diaphragm 4.

Preferred, the diaphragm 4 is divided into a treble region in the outer section, an alto region in the middle section and a bass region in the inner section according to sound frequency band; the wall thickness of the diaphragm 4 is gradually thickened from the outside to the inside, and the wall thickness of the bass region is greater than the wall thickness of the alto region, and the wall thickness of the alto region is greater than the wall thickness of the treble region; Based on this design, by setting the thicker bass area close to the center, the low-frequency vibration with lower frequency and larger amplitude can produce a sonorous and mellow bass in the bass region of diaphragm 4; By setting the thinner treble region away from the center, the high-frequency vibration with higher frequency and smaller amplitude can produce more transparent and bright treble in the treble region of diaphragm 4. The bar assembly 8 is located in the bass region, which can further enhance the load in the alto region of the diaphragm 4.

Preferred, the thickness of the inner end of the strip-shaped bar member 8*a* is greater than the thickness of the outer end. With this design, the central area of diaphragm 4 will be strengthened.

Preferred, the first groove 5 and the second groove 6 are arc grooves, which minimize the thickness mutation of diaphragm 4 and avoid affecting the resonance and vibration of diaphragm 4.

The length of the first groove 5 and the second groove 6 are less than the horizontal width of the diaphragm 4, and a smooth transition surface is set between the outer ends of the first groove 5 and the second groove 6 and the surface of the diaphragm 4, so that the vibration can be more evenly transmitted to the periphery of the diaphragm 4.

Other implementations and structural changes of the invention are described as follows:

1. In the above embodiment, the speaker shown in the figures is only for illustration purposes, and its structure is not used to limit the protection scope of the invention. Other speakers of similar structure that adopt the technical characteristics of the invention shall be covered by the protection scope of the invention.

Figure 5:
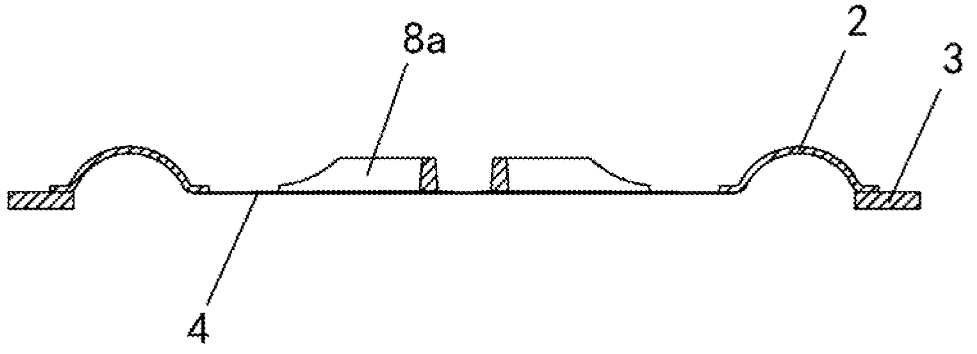
FIG. 5 is a schematic diagram of the bar assembly in the embodiment of the invention when it is installed on the upper surface of the diaphragm (without connecting bars)
Figure 6:
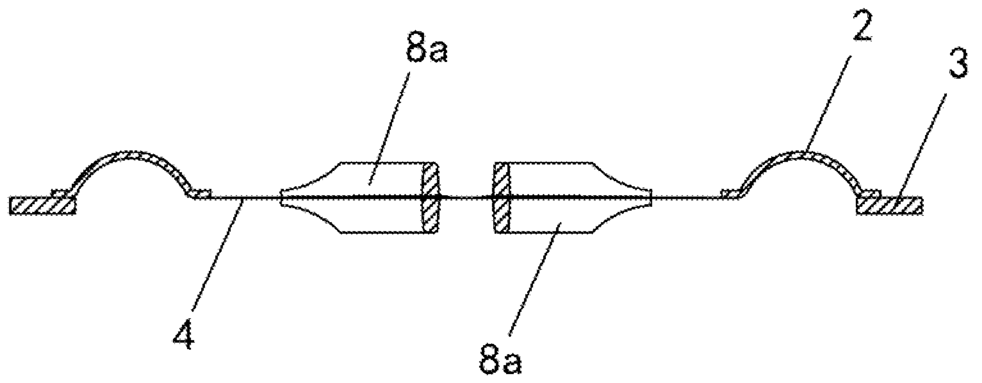
FIG. 6 is a schematic diagram of the bar assembly in the embodiment of the invention when it is installed on the upper and lower surfaces of the diaphragm at the same time (without connecting bars)
Figure 9:
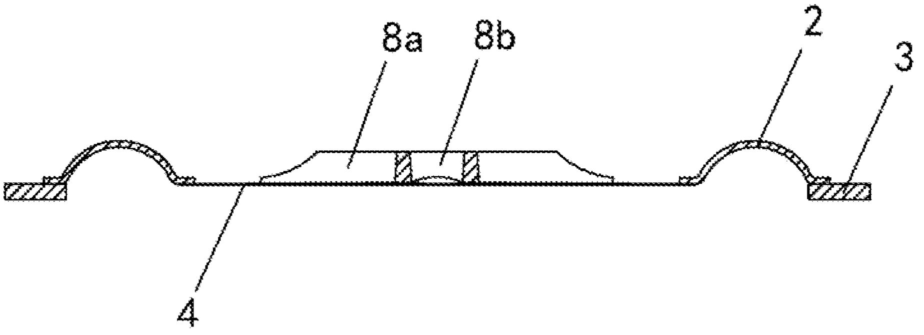
FIG. 9 is a schematic diagram (with connecting bars) when the bar assembly in the embodiment of the invention is installed on the upper surface of the diaphragm.
Figure 10:
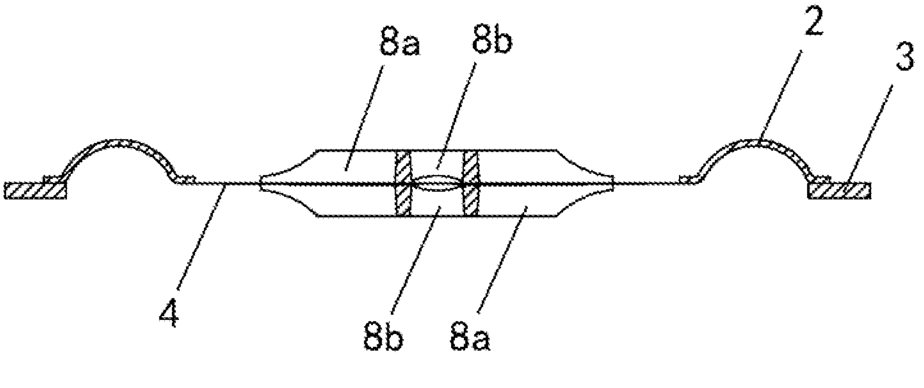
FIG. 10 is a schematic diagram (with connecting bars) when the bar assembly in the embodiment of the invention is installed on the upper and lower surfaces of the diaphragm at the same time.

2. In the above embodiments, the number of bar components 8 is not limited to one group, but can also be multiple groups in parallel or other designs that help to strengthen the load in the middle of diaphragm 4, which is easily understood and accepted by those skilled in the art.
3. In the above embodiment, the bar assembly 8 and the two grooves 5 and 6 can be located on the lower surface of the diaphragm 4 (as shown in FIGS. 4 and 8), or on the upper surface of the diaphragm 4 (as shown in FIGS. 5 and 9), or on the upper and lower surfaces of the diaphragm 4 at the same time (as shown in FIGS. 6 and 10).
4. In the above embodiment, the strip-shaped bar member 8*a* can be straight as shown in the figures, two of which are combined at 90 degrees, and are arranged on both sides of the first groove 2 and the second groove 3 in pairs.

Alternatively, the strip-shaped bar member 8*a* can also have an arc and include two straight edges, which are arranged on both sides of the first groove 2 and the second groove 3 in pairs through the straight edges of the adjacent two strip-shaped bar members 8*a*.

5. In the above embodiment, the first groove 5 and the second groove 6 are arc grooves. However, the invention is not limited to this. The groove can be designed into other shapes, such as V-shaped, U-shaped, W-shaped and other concave structures. This is easily understood and accepted by those skilled in the art.
6. In the above embodiment, the material of the diaphragm 4 can be metal, carbon fiber, paper, etc.

Compared with the prior art, the present invention improves the previous planar resonance speaker, especially the diaphragm design in the speaker, in order to solve the problem that the previous speaker is unable to take into account the treble, alto and bass registers and have good resonance timbre at the same time. It is embodied in the following aspects: first, a bar assembly is set up on the surface of the diaphragm; Second, the surface of the diaphragm is provided with a cross-shape groove, the cross-shape groove on the surface of the diaphragm to form a cross-shape sound tunnel.

Aiming at the problem that the timbre of treble register of the previous planar resonance speaker is not bright and the timbre of bass register is not sonorous and mellow enough, the structure and sound mechanism of the speaker are deeply discussed and studied, and the main reason for the poor timbre of treble register and bass register of the previous speaker is found out that the structure of the diaphragm is unreasonable. Therefore, the inventor breaks the shackles of the previous planar resonance speaker composition design, and boldly proposes an improved scheme of the invention. This improved scheme changes the diaphragm from the previous free vibration mode to the current standard vibration mode, and solves the problem that the timbre of treble register of the previous planar resonance speaker is not bright and the timbre of bass register is not sonorous and mellow enough from the perspective of vibration, resonance and phonation, improving the fidelity of sound in each frequency band. The practice proves that the improved scheme has outstanding substantive characteristics and remarkable technical progress, and has obtained obvious technical results.

The above embodiments are only intended to illustrate the technical conception and characteristics of the invention, and enable persons familiar with the technology to understand the content of the invention and implement it accordingly, but don't limit the scope of protection of the invention. Any equivalent variation or modification made in accordance with the spirit substance of the invention shall be covered by the protection of the invention.

The invention claimed is:

1. A full-frequency band high quality planar resonance speaker comprising:
- an outer frame; and
- a planar diaphragm with an outer edge that is connected to the outer frame via an elastic connector, wherein:
  - a sound source is arranged in a middle of the diaphragm;
  - a first groove and a second groove are arranged on a surface of at least one side of the diaphragm;
  - the first groove and the second groove are crossed and connected with each other on the surface of the at least one side of the diaphragm and an intersection point is located at the middle of the diaphragm;
  - the surface of the at least one side of the diaphragm is equally divided into four resonance regions;
  - the diaphragm is provided with a bar assembly at the middle of the diaphragm on the surface of the at least one side of the diaphragm;
  - the bar assembly comprises a plurality of strip-shaped bar members, which are arranged on both sides of the first groove and the second groove in pairs; and
  - the first groove and the second groove respectively form a sound tunnel on the surface of the at least one side of the diaphragm.

2. The full-frequency band high quality planar resonance speaker according to claim 1, wherein:
- a connecting bar is arranged between the two adjacent strip-shaped bar members of the plurality of strip-shaped bar members, and the connecting bar spans an upper part of the first groove and the second groove; and
- the connecting bar is located at the middle of the diaphragm.

3. The full-frequency band high quality planar resonance speaker according to claim 1, wherein:
- the diaphragm is divided into a treble region on a periphery, an alto region and a bass region in the middle, with the alto region between the treble region and the bass region, according to a sound frequency band;
- a wall thickness of the diaphragm is gradually increased from the periphery to the middle so that a wall thickness of the bass region is greater than a wall thickness of the alto region, and the wall thickness of the alto region is greater than a wall thickness of the treble region; and
- the bar assembly is located in the bass region.

4. The full-frequency band high quality planar resonance speaker according to claim 1, wherein a thickness of an inner end of a strip-shaped bar member of the plurality of strip-shaped bar members is greater than a thickness of an outer end of the strip-shaped bar member.

5. The full-frequency band high quality planar resonance speaker according to claim 1, wherein the first groove and the second groove are arc grooves.

6. The full-frequency band high quality planar resonance speaker according to claim 1, wherein:
- a length of the first groove and the second groove are both less than a horizontal width of the diaphragm; and a smooth transition surface is arranged between an outer end of the first groove and the second groove and the surface of the at least one side of the diaphragm.

* * * * *